April 18, 1933.  W. S. HOSMER  1,903,968
TRACTOR
Filed Nov. 2, 1931   2 Sheets-Sheet 1
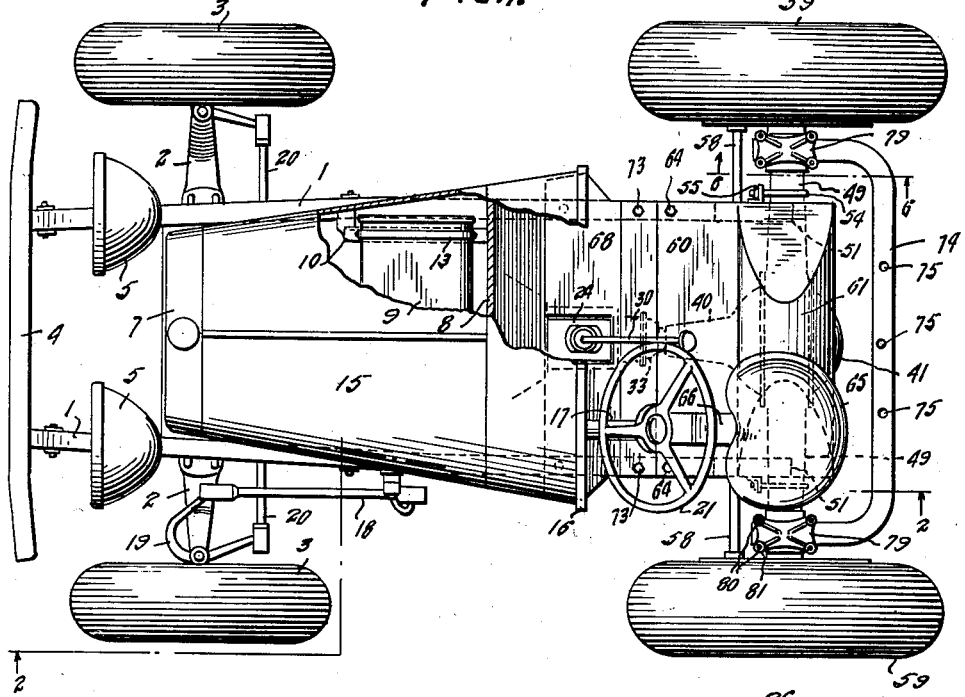
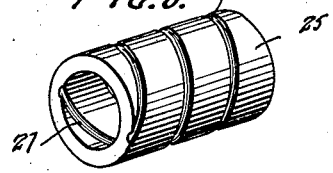
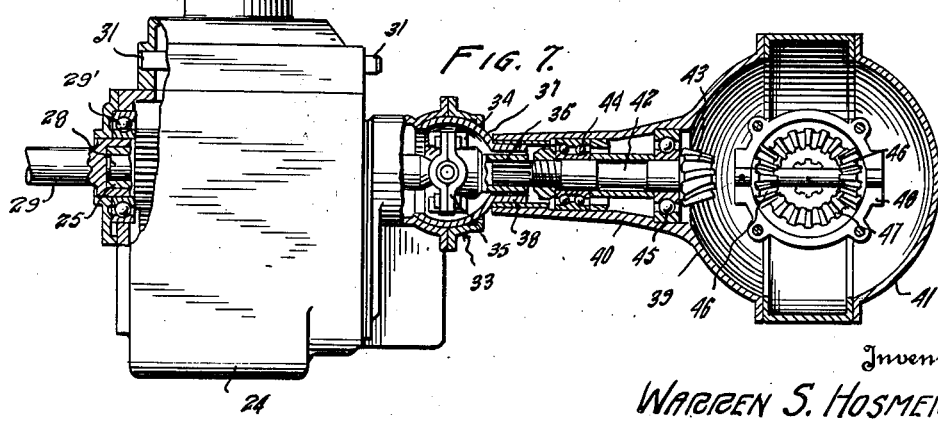
Inventor
WARREN S. HOSMER
By Semmes & Semmes
Attorneys April 18, 1933.    W. S. HOSMER    1,903,968
TRACTOR
Filed Nov. 2, 1931    2 Sheets-Sheet 2
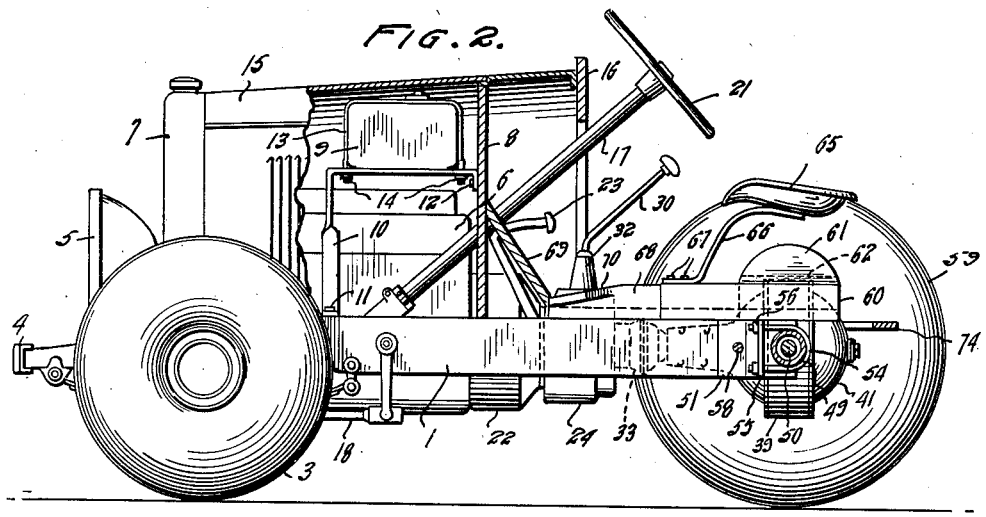
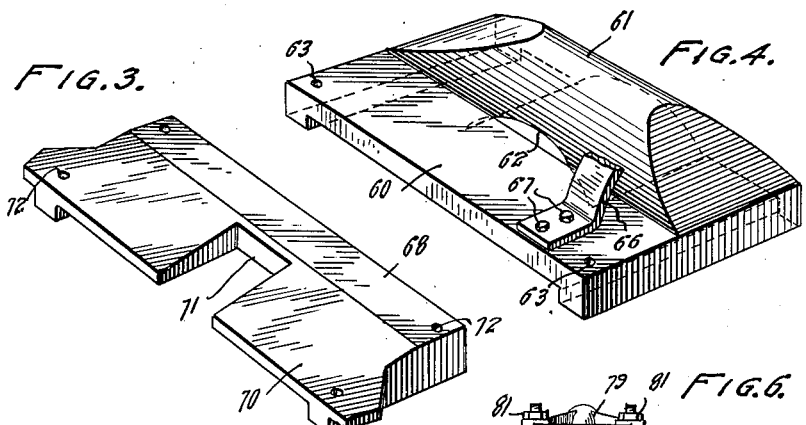
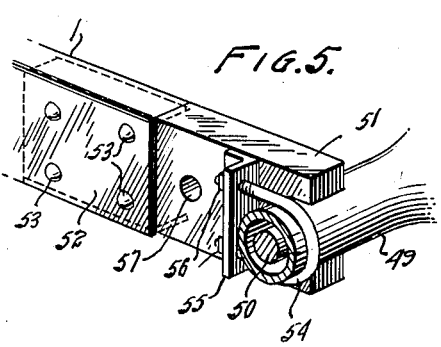
Inventor
WARREN S HOSMER
By Semmes & Semmes
Attorneys Patented Apr. 18, 1933

1,903,968

UNITED STATES PATENT OFFICE

WARREN S. HOSMER, OF BARTOW, FLORIDA

TRACTOR

Application filed November 2, 1931. Serial No. 572,689.

This invention relates in general to tractors and more particularly to a tractor having a shortened wheel base.

Tractors are designed generally to do heavy work and in a great many instances perform their work in very limited spaces. The nature of the work is such that excellent traction by the rear wheels is required, or the front if they are used as the driven wheels. If sufficient traction is not obtained, the maximum amount of work cannot be accomplished. It is desirable, therefore, to construct a tractor in such a manner as to provide for easy maneuverability and also to provide for positive traction at all times.

An object of this invention is to provide a tractor having a shortened wheel base.

Another object of this invention is to provide a shortened wheel base tractor having supplemental weight at the rear thereof.

A further object of this invention is to provide a tractor having a shortened wheel base with a draw bar rockably secured to the rear of the tractor.

Still another object of this invention is to provide a tractor in which no drive shaft between the transmission and differential is required.

A still further object of this invention is to provide a tractor in which the differential and transmission are directly connected without the intermediacy of a drive shaft.

Yet another object of this invention is to provide a novel attachment of the rear axle housing of a tractor to the frame.

Still a further object of this invention is to provide a tractor in which a universal joint takes care of any difference in alignment between the transmission and the differential.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

This invention broadly comprehends providing a tractor whose chassis is shortened by moving the rear wheels closer to the front wheels. This is accomplished by connecting the transmission of the tractor, through the intermediacy of a universal joint, to the differential. It will be readily seen that such an expedient eliminates the customary drive shaft, thereby greatly shortening the length of the chassis. The rear of the tractor is provided with heavy plates, which act as floor boards, to secure additional weight at the rear of the tractor for producing sufficient traction. Other features of the invention will later appear.

In order to make my invention more clearly understood, I have shown, in the accompanying drawings, means for carrying the same into practical effect without limiting the improvements in their useful applications to the particular constructions which, for the purpose of explanation, have been made the subject of illustration.

Figure 1 is a top view of a tractor constructed in accordance with my invention.

Figure 2 is a side elevational view taken along lines 2—2 of Figure 1.

Figure 3 is a perspective view of a portion of the flooring surrounding the gear.

Figure 4 is a perspective view of the flooring extending to the rear of the tractor with supplemental weight added thereto.

Figure 5 is a view showing the connection between the rear axle housing and the frame of the tractor.

Figure 6 is a side elevational view of the draw bar connection to the rear axle housing.

Figure 7 is a side elevational view partly in section showing the manner of connection between the transmission and the differential.

Figure 8 is a perspective view of a novel type of bearing employed in the transmission.

Referring to the figures in the drawings wherein the same characters represent like parts throughout and more particularly to Figures 1 and 2, there is shown a tractor constructed in accordance with my invention. It is to be clearly understood that a tractor embodying the underlying principles of my invention may be made by converting an automobile chassis or a truck chassis into my novel tractor, or if desired, may be assembled entirely from the individual parts. It is preferred, however, to manufacture my novel tractor out of new trucks to take advantage of mass truck production. In this manner an efficient tractor may be produced at a low cost and further, one which may be very economically repaired due to the low cost of parts.

As illustrated, the frame comprises side members 1 having a front axle 2 suitably secured thereto. A wheel 3 is attached to the front axle 2 on each side of the frame. The wheels 3 are preferably of the air wheel type, the reasons for which will hereinafter appear. Suitably secured to the frame 1 is a bumper 4 and a pair of headlights 5, both of which may be of conventional structure.

A prime mover 6 is positioned within the frame and is secured thereto by any suitable means. The prime mover 6 may be of the gasoline type, but it is to be understood that any suitable type of motive power may be employed. Associated with the prime mover 6 is a radiator 7 for supplying a cooling medium to the internal parts thereof. The space occupied by the prime mover is separated from the driving compartment of the tractor by means of a suitable strip 8 attached to the side members 1 of the frame.

A fuel tank 9 is positioned above the prime mover 6 and is supported by means of supports 10 secured to the side member 1 by bolts 11 and to the strip 8 by bolts 12. A bracket 13 is adapted to surround the fuel tank 9 to maintain it in a fixed position and is attached to the supports 10 by means of nuts 14. Surrounding the prime mover 6 and the fuel tank 9 is a hood 15. The hood 15 extends beyond the strip 8 and terminates adjacent a dash board 16 suitably secured to the frame. The hood 15 is of conventional structure and is secured to the frame by catches, not shown.

A steering shaft 17 extends through the vertical strip 8 and is attached to a steering rod 18. The steering rod is in turn connected to a steering arm 19 pivotally mounted on the axle 2 and adapted to actuate the front wheels 3. In order to provide uniform movement of the front wheels for steering purposes, a tie rod 20 is suitably positioned between the two wheels 3. A steering wheel 21 is attached to the steering shaft 17 and actuation of the steering wheel causes movement of the front wheels in unison due to the tie rod connection between the two wheels.

A clutch mechanism designated generally by the numeral 22 is connected to the prime mover 6. The clutch mechanism 22 may be of any conventional design and is actuated by a clutch pedal 23 suitably connected thereto. A transmission 24 is associated with the clutch mechanism for obtaining the various speeds desired. This transmission may also be of conventional design, but preferably a stronger spline shaft bearing 25 should be used to guard against damage due to the heavy duty which the tractor is to perform. The standard type of bearing used in the main drive shaft of the transmission will not withstand the heavy duty work. A bearing constructed to meet the requirements of heavy duty work and to also provide adequate lubrication is shown in Figure 8. The cylindrical bearing 25 is provided with external grooves 26 joined together to form a continuous groove, and internal grooves 27 similarly joined. The continuous grooves 26 and 27 form channels for conveying a lubricant to the various parts associated with the bearing. The bearing 25 may be made of special cast iron, brass, bronze or any suitable metal or alloy.

As shown in Figure 7, the transmission 24 has a spline shaft 28 extending therethrough. The spline shaft 28 is surrounded by the bearing 25. There is also provided as in the usual transmission structure, main shaft bearings 29' for a main shaft 29. The gearing within the transmission casing may be of any type, depending on the type of work the tractor is performing.

A gear shifting lever 30 is adapted to actuate a gear shifting shaft 31 positioned within the transmission to engage the gear desired. The gear shifting lever 30 passes through a transmission case cover 32 secured to the top of the transmission 24 by any suitable means.

Directly associated with the spline shaft 28 of the transmission 24 is a universal joint indicated generally by the numeral 33. The universal joint 33 is of standard structure, and any type adapted to take care of flexing of the parts to which it is connected, may be used. As shown in Figure 7, the universal joint includes trunnion bearings 34, rings 35, and a rear yoke 36. A casing 37 surrounds the various parts of the universal joint 33 and has an extension 38, the purpose of which will hereinafter appear.

A differential indicated generally by the numeral 39 is suitably secured to the extension 38 of the universal joint. The differential 39 has a differential extension 40 and an axle housing cover 41, which are of integral construction. The differential extension 40 is adapted to surround the extension 38, and a secure fit therebetween may be accomplished by any suitable means. The differential extension 39 encloses conventional structure of any suitable design and as shown, includes a shaft 42 carrying a pinion 43 which projects into the axle housing cover 41. The end of the shaft 42 opposite the pinion 43 which is splined is carried in the rear yoke 36 forming a spline housing and coacts with the universal joint 33 and spline shaft 28 in a manner well understood. Positioned within the differential extension 40 are bearings 44 and 45 which center the shaft 42 and reduce the friction produced by revolutions thereof.

The pinion 43 is adapted to coact with gearing within the cover 41 in order to impart motion to the rear wheels. The arrangement of the gearing is also conventional and as shown includes a differential pinion 46 coacting with a differential side gear 47 which are enclosed in a differential case 48.

It will be readily seen from the above description that I have greatly shortened the wheel base of a vehicle by eliminating the propeller shaft connection between the universal joint and the differential. I have found that by connecting the differential extension 40 directly to the universal joint 33, a strong assemblage may be provided and further that only one universal joint is required. Not only does this invention provide a tractor with an exceptionally short wheel base, but also presents the advantage of less parts to be replaced and repaired.

Constructed integral with the housing 41 is an axle housing 49 enclosing a rear axle 50 on each side of the housing 41. The rear axle housing 49 is attached to the frame 1 as shown in Figure 5. As illustrated, a bifurcated extension 51 of larger width is secured to the frame 1 by means of a connecting plate 52. The connecting plate 52 is adapted to receive bolts 53 which hold the frame 1 and extension 51 in fixed relationship. As will be noted, by providing the bifurcated extension 51 of larger width, a greater bearing surface between the bifurcated ends of the extension of the axle housing is provided. The axle housing rests within the bifurcated ends of the extension and is secured thereto by means of a U bolt 54 secured to an extension plate 55 by means of nuts 56. The plate 55 may be welded or secured to the extension 51 by any other suitable means, not shown.

As will be noted from Figure 5, an aperture 57 is provided in the extension 51. The aperture 57 is adapted to receive an emergency brake cross shaft 58, connected to the brake mechanism associated with the rear wheels.

Rear wheels 59 are connected to the rear axle 50 in any suitable manner. As will be noted the rear wheels 59 are of larger size than the front wheels 3. The rear wheels are also of the air wheel type in view of the great bearing surface provided thereby. It will be readily appreciated that by providing air wheels of large size, the tractor is made particularly adaptable to golf courses and the like and gives excellent traction in sandy soil.

In order to provide additional weight at the rear of the tractor to prevent it from rising up when pulling a load, a metallic floor member 60 is employed. The member 60 is provided with an integral metallic projection 61 which lends additional weight to the rear of the tractor. A cutout portion or groove 62 is made in the rear of the member 60 and immediately below the integral projection 61. This cutout portion is adapted to conform to the shape of the housing 41. As shown particularly in Figures 1 and 2, the metallic member rests upon the frame 1 and bifurcated extension 51 with the rear part thereof projecting beyond the extension 51. The housing 41 which engages the cut-away portion 62 acts as an additional support to the member 60. The member 60 is provided with apertures 63 adapted to receive bolts 64 for securing it to the frame.

The metallic member 60 may be made of cast iron or any other suitable metal. The integral projection may be of the same metal, or if desired, a heavy metal, such as lead, may be employed. While I have shown the projection 61 as being tapered at its ends, it is to be clearly understood that the tapering parts may be eliminated and the projection made of uniform dimensions.

A seat 65 is secured to the member 60. As shown in Figure 2, a support 66 is attached to the member 60 by means of bolts 67. The seat 65 rests on the support 66 and is secured thereto by any suitable means.

As shown in Figure 3, a metallic floor plate 68 is adapted to close the space between the member 60 and a floor board 69 slanting from the vertical strip 8 to the frame. The floor board may also be of metal and a part thereof is tapered, as at 70, in order to have an even juncture point between it and the foot board 69. A cutout portion 71 surrounds the casing 32 and permits it to extend therethrough. The floor plate 68 is provided with apertures 72 adapted to receive bolts 73 for securing it to the frame of the tractor.

A draw bar 74 having a plurality of apertures 75 for receiving a vehicle to be towed is rockably mounted on the axle housing 49. As will be noted, the draw bar 74 extends from the rear spring seats, no rear springs being used in my invention. In Figure 6, are shown the details of the mounting. The axle housing is surrounded by a spring seat mounting plate 76 having a collar 77 projecting therefrom. The ends of the draw bar 74 rest on the spring seat 76 and a portion thereof is bent over as at 78 to prevent the draw bar from being pulled from its connection. A plate 79 is adapted to rest on the draw bar end and is secured to the mounting plate by U-bolts 80 passing around the collar 77. The assembly is maintained secured by means of nuts 81 connecting the U-bolt 80 and the plate 79. It will be seen that when the tractor is moving over uneven ground, the draw bar is rocked, thereby preventing the possibility of sheering the connection.

It will be apparent from the foregoing that I have provided a novel type of tractor with a shortened wheel base. There is also provided by this invention a tractor having supplemental weight concentrated at the rear thereof to prevent it from raising up under heavy load conditions. There is also provided a novel type of draw bar attachment to the spring seats positioned on the rear axle housing together with a special type of mounting of the rear axle housing in the frame of the tractor.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A tractor comprising a frame, a transmission and a differential secured thereto, a universal joint positioned between the differential and the transmission adapted to connect them directly to each other so as to shorten the wheel base of the tractor, and a metallic plate having a weighted lug associated therewith to maintain the tractor in a level position when exerting a forward pull, said metallic plate being cut away on its underside to receive the differential.

2. A tractor comprising a frame having side members, front and rear wheels carried by said frame, and a weighted plate-like member positioned on the rear of the frame and extending transversely between said side members to constitute a platform.

3. A tractor comprising a frame having side members, front and rear wheels carried by said frame, and a platform composed of weighted plate-like members extending between said side members.

4. The combination set forth in claim 3, with a seat mounted upon the platform.

In testimony whereof I affix my signature.

WARREN S. HOSMER.